United States Patent [19]

Kaufmann

[11] 4,160,346
[45] Jul. 10, 1979

[54] ROOF COATING COMPOSITION AND CONSTRUCTION

[75] Inventor: John H. Kaufmann, Somerset Parish, Bermuda

[73] Assignee: Global Coatings Limited, Hamilton, Bermuda

[21] Appl. No.: 795,888

[22] Filed: May 11, 1977

[30] Foreign Application Priority Data

May 11, 1976 [GB] United Kingdom ............... 19410/76

[51] Int. Cl.² .......................... E04B 7/00; E04D 11/00
[52] U.S. Cl. ............................................. 52/96; 52/94; 52/309.8; 52/309.12; 52/404; 52/516
[58] Field of Search ................. 52/58, 62, 94, 96, 516, 52/309.7, 309.8, 404, 309.12

[56] References Cited

U.S. PATENT DOCUMENTS

| | | | |
|---|---|---|---|
| 44,675 | 10/1864 | Straub | 52/516 |
| 3,122,073 | 2/1964 | Masse | 52/404 X |
| 3,134,464 | 5/1964 | Markle | 52/404 X |
| 3,280,528 | 10/1966 | Dunlap, Jr. | 52/309.8 |
| 3,389,518 | 6/1968 | Horbach | 52/309.8 |
| 3,483,664 | 12/1969 | Funk et al. | 52/96 X |
| 3,736,715 | 6/1973 | Krumwiede | 52/404 |

FOREIGN PATENT DOCUMENTS 1306771 9/1962 France.
1136711 12/1968 United Kingdom ...................... 52/582

*Primary Examiner*—Alfred C. Perham

[57] ABSTRACT

A roof having an insulating blanket of plastic foam covered by a protective sheath made up of a shell of reinforced concrete covered by a weather-impervious rubbery textured membrane. The membrane and the shell are married together in the sheath, the shell providing load bearing strength and the membrane protecting the shell and preserving its properties. The shell adheres tenaciously to the insulating blanket and the membrane to the shell. In a preferred construction, the sheath forms a protective bonnet having a girdle surrounding the eaves and verge further anchoring the roof covering to the superstructure of the building. Shingles of special construction preferably make up the insulating blanket. Special cement and latex binder compositions are disclosed for the shell and membrane respectively.

11 Claims, 8 Drawing Figures

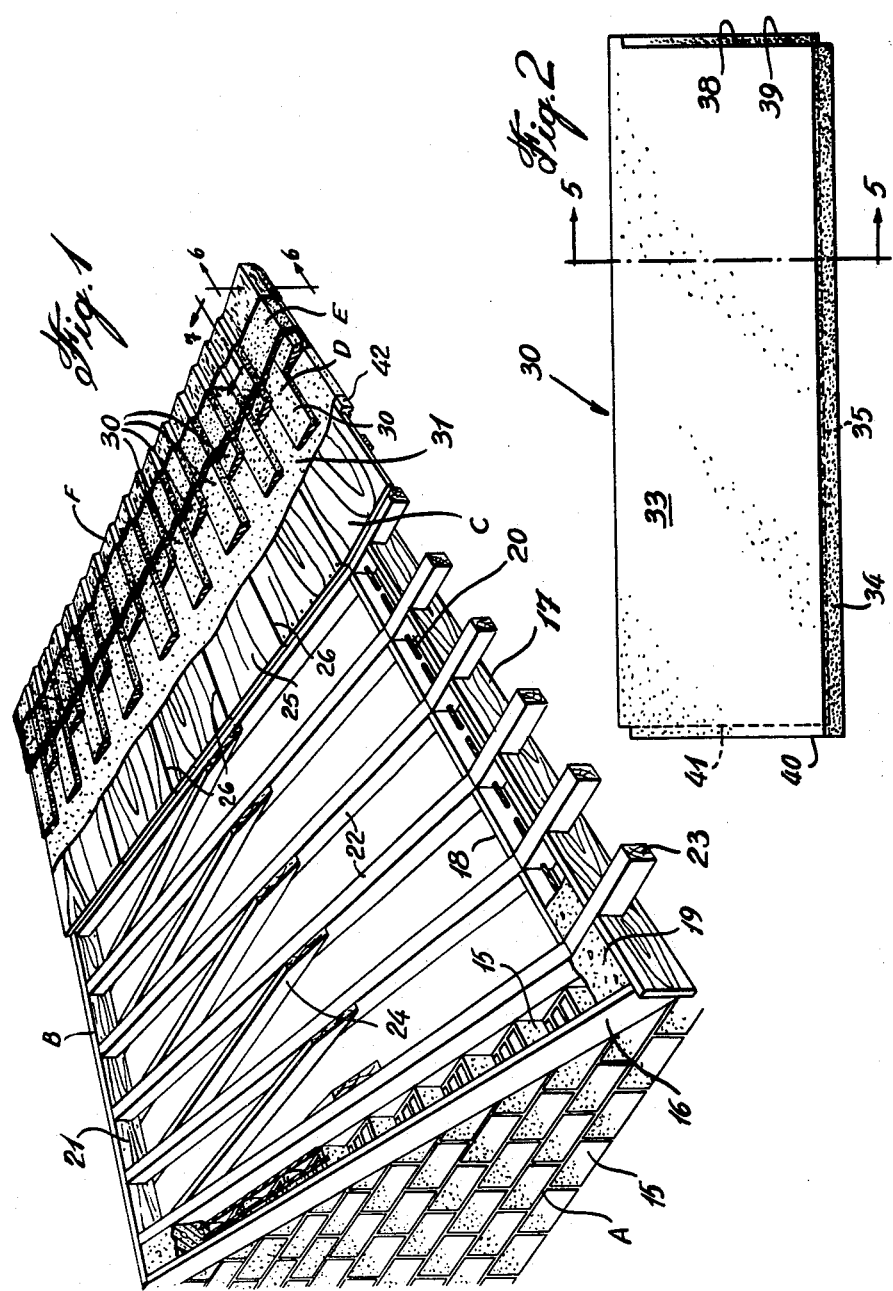

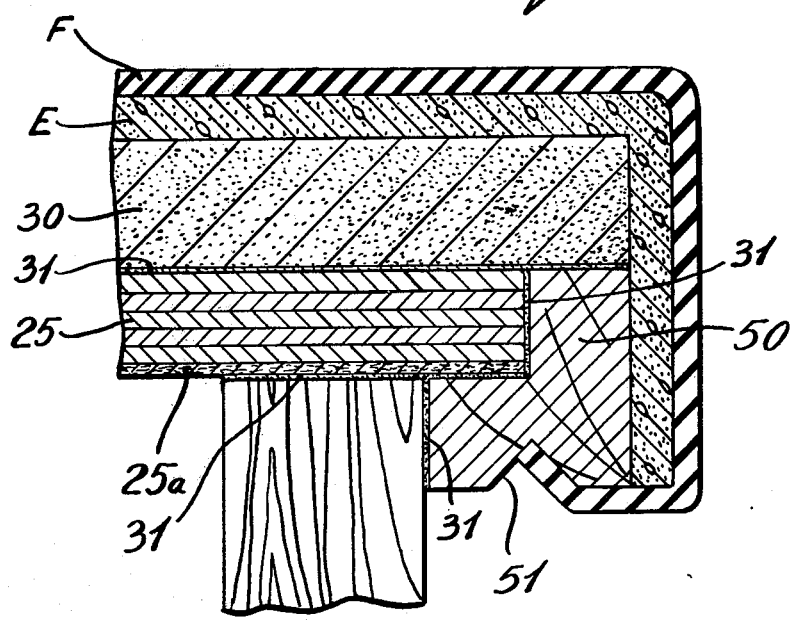
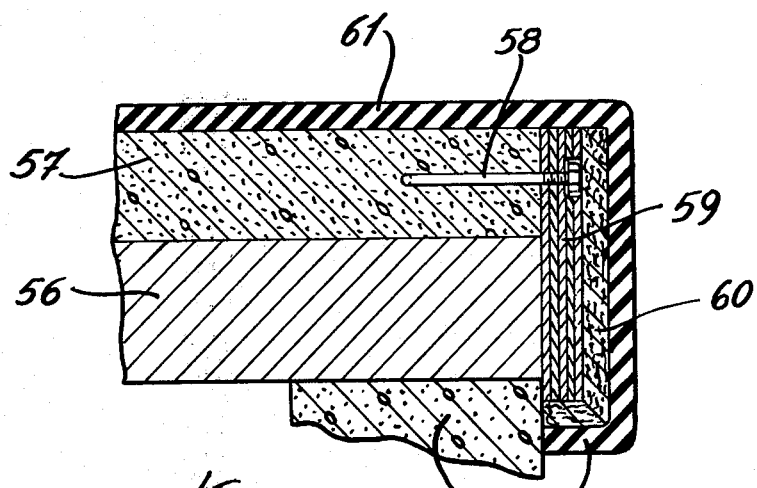

ROOF COATING COMPOSITION AND CONSTRUCTION

BACKGROUND OF THE INVENTION

1. Field of the Invention

This invention relates to the construction of buildings and is specially concerned with building elements subjected to weather, for example, roofs and walls, and with components of these elements, for instance, coatings.

A specific utility of the invention is in providing an improved form of Bermuda roof. This type of roof will, therefore, serve as a convenient starting point for the understanding of the invention, although it must be understood that the invention is not limited to this use. The Bermuda roof has a sloping deck clad with a plurality of limestone slabs over-lapped to provide a stepped or contoured surface which is covered with paint or a cement wash to render it waterproof. This roof has a characteristic appearance as will be readily recognized by anybody who has visited Bermuda.

Applying the invention to the construction of a Bermuda roof, the stone slabs are replaced by wedge-shaped interfitting insulating shingles of substantially impervious synthetic resin closed cell foam firmly secured to the deck, to form a continuous insulating blanket. The blanket is covered by a load-bearing impact-resistant weather impervious sheath. The sheath is made up of a hard, essentially reinforced concrete shell adhering tenaciously to the top surface of the shingles and an essentially rubbery-textured membrane covering the shell and adhering tenaciously to it. Critical characteristics of the sheath materials and advantageous detailed features of construction which may be accomplished by their use will be described as this disclosure progresses.

2. Description of the Prior Art

The general prior art of constructing roofs and walls is replete in the use of synthetic resin foam in combination with other structural and coating material. For example, one patent, which, at first glance, might be considered analogous to the applicant's development, is directed to cladding a flat surfaced wall or roof, employing a plurality of resilient thermo-insulating cellular polystyrene plates to form an insulating layer covering the wall or roof support. Over the insulating layer there is applied a continuous intermediate layer consisting essentially of a synthetic resin having a reinforcing glass fabric embedded in it. The patentee describes the intermediate layer as being of polyvinyl chloride or a butadiene styrene copolymer, having quartz powder distributed throughout and a propionic acid binder which he says may be mixed with an equal amount of Portland cement. On the free outer face is formed a continuous plaster coating, consisting essentially of a mixture of quartz and synthetic resin cementitious material, which the patentee suggests may be formed of propionic acid ester.

This prior art has the following characteristics. Polyvinyl chloride deteriorates on ultraviolet exposure and gives off corrosive hydrogen chloride. Polyvinyl chloride film blackens and brittles and requires plasticizers for usable flexibility. Butadiene styrene polymers oxidize in ultraviolet light with severe yellowing and embrittlement due to cross-linking. They require the use of antioxidants. Propionic acid esters and polyvinyl acetates hydrolize in the presence of moisture and alkali.

SUMMARY OF THE INVENTION

The applicant's construction contrasts with the teachings of this and other prior art patents by its special protective load-bearing and weatherproof sheath in which there are married together a hard essentially reinforced concrete shell covering the insulating blanket and a soft essentially rubbery-textured plastic membrane covering the shell, the nature and advantages of which will be apparent from the detailed description to follow. A feature of the sheath is that the components may be applied at once at essentially their ultimate thickness. Both the cement mixture to form the concrete shell and the extended resinous mixture for forming the membrane are material in a flowable plastic state which can be spread on a flat or uneven surface. The materials and construction specified by the patentee endow the structure with important properties lacking in materials suggested in earlier proposals.

A preferred sheath is made up as follows. It includes a continuous hard tough shell from about 1.5 mm. to about 5.0 mm. thick of reinforced concrete made with hydraulic cement modified with from about 5% to 20% on a solids weight basis of the total of a synthetic resin latex modifier and desirably reinforced with glass fibers. This shell adheres tenaciously to the surface of the insulating blanket. Adhering tenaciously to the shell is a soft rubbery membrane from about 0.75 mm. to about 3 mm. thick based on a binder matrix of a non-plasticized latex of an acrylic elastomeric-type polymer having a $T_g$ within the range from about $-35°$ C. to about $-45°$ C. containing from about 50% to about 60% by weight of finely divided extender. The membrane and shell are married together as an essentially integral unit with the shell providing load-bearing strength and the membrane sealing the shell from the outside and preserving properties of the relatively thin concrete which could be otherwise deteriorated by exposure to the elements. Because of interaction between the setting membrane material and the concrete, the interface between the membrane and the shell is free of moisture-escape blisters which often occur between latex-deposited films and substrates. This is because the membrane is formed with an emulsion (or latex) in which the discrete copolymer (acrylic) particles are dispersed and which permits the formation of a film with minute capillary openings which permit moisture vapor trapped in a building to escape without causing blistering of the membrane as would occur with a membrane formed with a solution polymer binder (continuous solid film as taught in the prior art patent mentioned).

BRIEF DESCRIPTION OF THE DRAWING

Having thus generally described the invention, it will be referred to in more detail by reference to the attached drawing by illustrating preferred embodiments and in which:

FIG. 1 is a fragmentary perspective view of a building having a roof constructed, according to the invention, with parts removed to show the construction;

FIG. 2 is a top plan view of a preferred form of insulating shingle used to form the insulating blanket;

FIG. 7 is an enlarged fragmentary cross-section along the line 7—7 of FIG. 1 through the verge of the roof; and FIG. 8 is an enlarged fragmentary cross-section illustrating the application of the invention to another type of roof.

DESCRIPTION OF THE PREFERRED EMBODIMENTS

Figure 3:
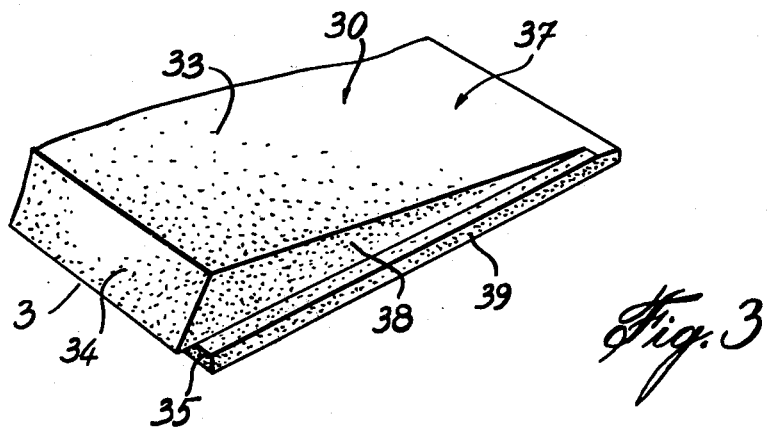
FIG. 3 is an enlarged fragmentary perspective view of one end of the shingle shown in FIG. 2.

Referring more particularly to the drawings, there is shown a building having a wall A made up of a number of building blocks 15. A roof B is carried by the wall A through an end beam 16, side beams 17 and 18 enclosing a concrete belt course 19 having a reinforcing rod 20, and a ridge beam 21. Rafters 22 extend between the ridge beam and the beam 18 and a rafter foot 23 protrudes from each rafter 22 through the belt course 19 and through a notch in the beam 17.

A roof deck C is made up of sheets 25 of plywood butted together edgewise, with fissures 26 intervening them. The undersurface of the plywood 25 is preferably covered with a layer of plaster 25a prior to erection. A preferred material for this purpose is sold as "Sunny Plaster SP" by Coatings International Limited, Hamilton, Bermuda. Preferably the fissures 26 are caulked with a caulking composition. The roof deck C slopes at an angle to provide drainage and an aesthetic appearance in the roof above it.

On top of the deck C is laid an insulating blanket D made up of a number of interfitting synthetic resin foam shingles 30. The shingles are preferably held to the deck by adhesive 31 although they may be secured by nailing or otherwise. A preferred adhesive is a water-based foam and tile adhesive sold under the trade mark "Nova 96" by Coatings International Limited of Hamilton, Bermuda.

Figure 4:
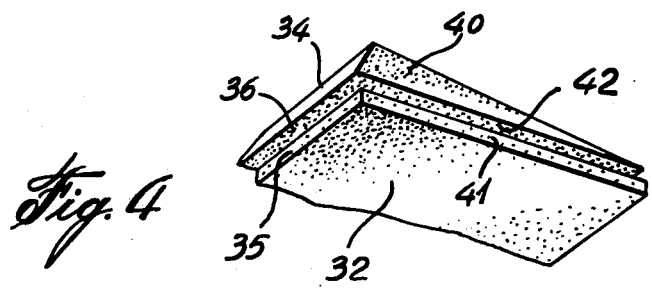
FIG. 4 is a fragmentary perspective view of the other end of the shingle shown in FIG. 2.
Figure 5:
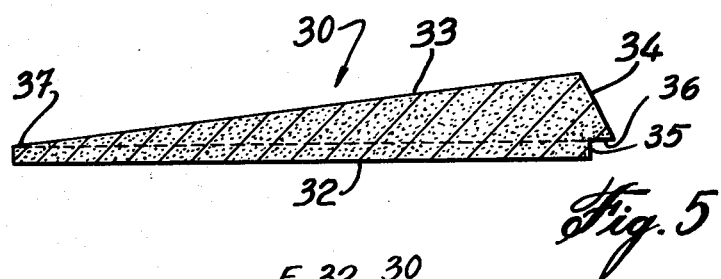
FIG. 5 is a cross-section along the line 5—5 of FIG. 2.

In the example roof, the shingles 30 are of the form shown in FIGS. 3 to 5. Each shingle is tapered and has an undersurface 32 and a merging upper surface 33. Each shingle has a stepped leading end with off-set surfaces 34 and 35 with an intervening shoulder 36 providing a receiving recess (for the thin end of the adjacent shingle higher on the roof) and a thin end 37. One side of each shingle is stepped to provide a side surface 38 and a projecting flange 39. The other side is stepped to provide a side surface 40 and an inwardly stepped narrow surface 41 and shoulder 42 providing a recess for receiving the flange 39 of the adjacent shingle. The shingles are laid in interlocking relationship with those in one row staggered relative to those in the next, as will be readily apparent from FIG. 1 considered in conjunction with the construction of the shingles in FIGS. 2 to 5. Together the shingles form a continuous (apart from the fissures between the shingles) blanket having a stepped or contoured surface covering the deck C. The use of relatively short shingles instead of an elongated strip minimizes the overall expansion and contraction across the roof with temperature changes.

The synthetic insulating foam material of the shingles, because of its voids provide good insulation of the deck C against heat and cold. However, the material lacks structural strength and impermeability to moisture and other influences and requires protection in these respects. To this end, the entire surface of the insulating blanket D is protected, according to the invention, by the adhesive load-carrying sheath made up of a hard, essentially reinforced concrete shell E covered by the soft essentially rubbery textured plastic membrane F, applied as follows.

The hard shell E is preferably formed by spreading over the continuous surface of the roof B a coating of spreadable hydraulic cement-aggregate mix reinforced with finely divided inert material and short glass fibers. The coating is allowed to set to form the thin continuous hard concrete layer E having a thickness from about 1.5 mm. to about 5 mm. conforming to the surface of the insulating layer D and adhering tenaciously to it.

The soft rubbery membrane F is formed by spreading, over the concrete shell E, a matrix-forming composition containing major amounts of finely divided extender and a synthetic resin aqueous emulsion binder. the coating solidifies to form the rubbery membrane, adhering strongly to the shell, it conforms to the surface contours of the insulating layer D and accommodates its expansion and contraction while adhering tenaciously to its surface.

Figure 6:
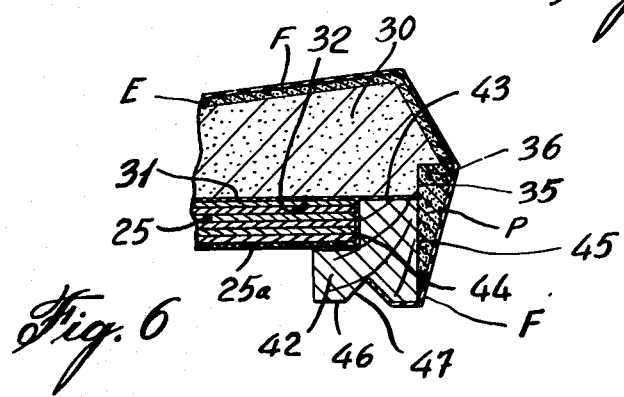
FIG. 6 is an enlarged fragmentary cross-section along the line 6—6 of FIG. 1 through the eaves part of the roof.

As shown in FIG. 6, the leading edges of the shingles at the lower edge or eaves of the roof extend beyond the edge of the deck 25 and are supported by an overall rectangular eaves-finishing strip 42. The strip 42 has an upper face 43 juxtaposed to the undersurface 32 of the shingles 30, a recess 44 receiving the edge of the deck plywood sheets 25, an outer face 45, and an undersurface 46 which is provided with a longitudinal groove 47 to intercept water blown inward along its surface. The surfaces 36 and 35 of the shingles form with the surface 45 of the strip a pocket to receive a concrete fillet. In accordance with the invention, the shell E continues from the upper surface 33 of the eaves shingles down their leading face 34 and into the pocket to provide a massive anchoring fillet P which adheres tenaciously to the undersurfaces of the shingles 34 and to the surface 45 of the strip 42.

The membrane F also continues over the edge of the roof, covering the parts of the shell in that zone. The membrane extends beyond the shell along the undersurface 46 and into the surface of the groove 47, adhering tenaciously to these surfaces. The shell E is thus anchored to the edge of the roof and acts to protect and retain the edges of the eaves shingles 30. The membrane F completes the job by enveloping the entire edge of the roof in what amounts to a bonnet having a girdle extending down from the top surface and then inwards, sealing the roof against ingress of moisture and further anchoring to the roof deck the shingles of the insulating blanket D and the entire sheath made up of the shell E and the member F.

At the end of the roof there is a verge-finishing strip 50 like the eaves-finishing strip 42. This is overlapped by the shingles 30, the undersurfaces of which are adhesively secured to the strip by adhesive 31.

The skirt of the shell E extends down the verge to the bottom of the side of strip 50. The membrane F extends over the verge covering the shell E and across the undersurface of the strip 50 as far as its groove 51.

FIG. 8 shows the corner of another building employing certain teachings of the invention. The top of a concrete wall 55 supports a steel deck 56 which, in turn, supports a concrete slab 57. Anchored by bolts 58 to the concrete slab is a plywood strip 59. In accordance with the invention this corner structure is covered with a thick fillet 60 of a glass fiber-filled coating composition of the type used to form the membrane F. A continuous membrane 61 is also applied to adhere tenaciously to the surface of the slab 57, the fillet 60, and the strip 59 to extend underneath the plywood strip in a flange 62.

Variations in Materials

While the preferred material for the supporting deck A of the structure shown in FIGS. 1 to 8 has been shown as sheets 25 of plywood, other structural materials can be employed, for example, tongue-and-groove timber, corrugated iron, or concrete.

The insulating blanket D is preferably of a synthetic resin foam material capable to being worked, for example, by sawing from a block or sheet or by molding, to provide shingles 30 as described which can be fitted together to provide a continuous covering apart from the fissures at the interface between the respective shingles 30. A preferred material is a closed cell polystyrene foam of a density from about 1 to about 3 pounds, preferably approximately 2 pounds, per cubic foot. One good material is sold under the trade mark "Styrofoam" as described, for example, in the booklet "AMSPEC Full Sidewall Insulation and Wood Frame Construction with Styrofoam Brand Plastic Foam", Amspec Inc., September 1972, Columbus, Ohio, the disclosure of which is incorporated by reference.

Shell

The shell E is essentially a continuous hard tough load-carrying sheet of reinforced concrete having a thickness within the range from about 1.5 mm. to about 5 mm. which armor-plates the blanket D and adheres tenaciously to it. Preferably this concrete is made with hydraulic cement, fine aggregate and reinforcing material, preferably glass fiber, modified by the use of from about 5% to about 20% of a synthetic resin latex cement modifier to provide it with high impact strength (at least 6 to 16 inch pounds), high flexural strength, thin section strength, high tensile strength (greater than 100 pounds per square inch), shear bond adhesion (at least ten times that of unmodified concrete made with Portland cement) and the capacity of adhering tenaciously to the substrate and other properties. In certain cases, for example, where the substrate is flat, scrim cloth may be used to reinforce the the concrete. The resulting concrete also has a high tensile and flexural strength and adhesion necessary to resist freeze-thaw lifting and the durability to withstand weathering and ultraviolet degradation. The cement mix is curable under ambient conditions.

Preferred cement modifiers are aqueous acrylic emulsions as for example described in the article entitled "Acrylic Modifiers for Cement", "Resin Review", Vol. 24, No. 2 (1974), hereby incorporated by reference. A preferred cement composition, according to the invention, contains from about 45% to about 60% Portland cement by weight on a dry solids basis and about 5% to about 20% of the acrylic cement mortar modifier resin emulsion "Rhoplex E-330" (solids 47% ±0.05%) described in the brochure "Rhoplex E-330 Cement Mortar Modifier", Rohm and Haas, August 1974, hereby incorporated by reference, or "Rhoplex MC-76" (solids 47%±0.5%). Less preferred concretes may be obtained by using other commercial latex cement modifiers, for example, containing butadiene styrene, vinylidene chloride, or polyvinyl acetate.

Preferred aggregate materials are fine silica sand within the size range from about 20 to about 100 microns, finely divided calcium carbonate of a size range from about 2 to about 20 microns, and quartz flour of a size range from about 10 to 100 microns. The quartz flour provides for a hard finish. The calcium carbonate gives spreading and working characteristics.

A preferred concrete is made by mixing together a first product including Portland cement, short glass fibers, silica sand, powdered limestone, wetting agents and defoamers with a second product including a liquid acrylic aggregate additive containing enough water for a concrete mix.

The cement mixture can be sprayed on or spread on with a trowel. If sprayed on it is subsequently troweled or brushed. The drying time for the concrete is two to three hours and the setting time about 12 hours. The modified concrete reaches about 90% of its ultimate strength in about 48 hours and cures after about seven days.

The Membrane

The membrane F is essentially a matrix of a rubbery material laid down from a creamy spreadable latex of elastomeric-type synthetic resin highly filled with a finely divided inert extender as a bodying agent. The membrane is a continuous layer tenaciously adhering to its substrate and having a thickness within the range from about 0.75 mm to about 3.0 mm The extender should be present in an amount from about 50% to about 60% by weight of the total matrix plus filler. A preferred extender is preferably calcium carbonate, desirably being a blend of different sizes having a particle size within the range from about 2 to about 12 microns with the average from about 4 to about 12 microns. The mixed particle sizes improve packing of the system to the benefit of membrane continuity and physical properties. The membrane is resistant to fumes, chemicals, sea air, salt spray, it is freeze-resistant, non-brittle at low temperatures, non-runny at high temperatures, stable under prolonged exposure to ultraviolet light, has low dirt pick-up and is tenaciously adhesive to its substrate.

A preferred coating composition for the membrane is made by using as a binder composition an intimate mixture of "Rhoplex LC-67" ($T_g$ about $-40°$ C. to $-45°$ C., pH between about 7 and 8) acrylic emulsion for plasticizer-free caulks and "Rhoplex AC-707" ($T_g$ about $+5°$ C. to about $+15°$ C.) high solids acrylic emulsion vehicle in the proportions to provide a film having a $T_g$ within the range from about $-35°$ C. to about $-45°$ C. For some applications the AC-707 may be omitted allowing for high loading with extender or allowing at the same extender level for a lower $T_g$ down to about $-45°$ C. For the significance of $T_g$ see the brochure "The Characterization of Polymers" by Rohm and Haas (CM-106 D/cd) and "Plastics in the Modern World" by Couzens and Yarsley, Penguin Books Ltd. (1968), pages 217 and 218., the disclosures of which are hereby incorporated by reference.

Preferred formulations are as follows, the percentages being given by weight:

| | |
|---|---|
| Total resin emulsion solids | 44% |
| Total filler and pigment | 51% |
| Miscellaneous constituents | 5% |

The composition as manufactured should have a consistency within the range from about 5 to about 50 seconds as measured by the Semco running test referred to as follows in "Formulating Guide for Acrylic Latex Caulks" by Rohm and Haas, Philadelphia, 1975. A 6 oz. samples of the composition is loaded into a polyethylene cartridge and gunned under a pressure of 50 pounds per square inch through a Semco air-powered caulking gun fitted with a Semco nozzle with a 1/8th inch diameter orifice. The time, in seconds, required to gun the caulk sample is the FIGURE used to define the consistency. For example, if it takes 25 seconds to gun the sample, the composition is said to have a consistency of 25. The consistency may be adjusted with water or a glycol for spray or brush application and open time.

The membrane material can be brushed on, troweled on, or sprayed on and brushed. A second and third coat, depending on thickness, can be applied in a minimum of about two hours and a maximum of about 12 hours depending on weather conditions. The membrane should not be applied till 4 or 5 hours at the earliest, preferably about 12 hours after the concrete is applied.

In more detail "Rhoplex LC-67" is described in the brochure of Rohm & Haas entitled "Rhoplex LC-67 Acrylic Emulsion for Plasticizer-Free Latex Caulks" (1976), the disclosure of which is hereby incorporated by reference. As described in this literature, this binder has the following characteristics, in terms of its use in caulks. By its use, as a binder, a high quality caulk may be made which is not subject to plasticizer migration problems such as glossing and tackifying of paints with accompanying dirt pick-up, mildew growth, and loss of caulk flexibility on exterior exposure. Caulks using this binder retain the performance advantage of current commercial caulk emulsions over conventional latex caulks in terms of low shrinkage, initial low temperature flexibility, resistance to discoloration on aging or ultraviolet exposure, and dry and wet adhesion to alkyd paints, glass, glazed ceramic and concrete substrates. Using formulations embodying this binder, a latex caulk can be manufactured which exhibits superior adhesion properties and superior elongation with satisfactory tensile and recovery properties.

According to the manufacturer's literature, this aqueous acrylic emulsion polymer binder has the following typical properties:

| Appearance | Milky white liquid |
|---|---|
| Solids content, % | 64.5 to 65.5 |
| pH, as packed | 4.8 to 5.4 |
| Specific gravity | 1.04 |
| Density, lbs./U.S. gal. | 8.66 |
| Minimum film-formation temperature, °C. | less than 0 |
| Glass transition temperature ($T_g$), °C. | approximately −50 |
| Tukon hardness (KHN) | less than 1 |
| Storage stability | protect from freezing |

To further characterize this binder, it should be noted that typical caulk formulations using it contain along with it major amounts of a primary extender or filler to provide good caulk performance in terms of caulk rheological and application properties and in minor amounts a drying retarder to provide working times for applying the caulk, defoamer to eliminate gas, a wetting agent and emulsifier which tends to stabilize the binder emulsion and improve the caulk mechanical stability and lowers the caulk consistency and enhances its package or self-stability, a primary pigment dispersion which contributes to forming a stable homogeneous and creamy low consistency caulk, a secondary pigment dispersion which is essential to form a stable, homogeneous caulk with good package stability, and an organic liquid which provides freezethaw stability.

Caulk formulations of the type described to characterize the binder are described to explain the nature of the formulation to which the compositions of the present invention belong. The caulk formulations do not, themselves, normally have the consistency required for application by normal coating methods and where laid down in a coating layer do not have adequate coating characteristics.

"Rhoplex AC-707" is described in the Rohm and Haas booklet "Rhoplex AC-707 High Solids Acrylic Emulsion Vehicles for Exterior and Interior Latex Paints" (July 1974), the disclosure of which is hereby incorporated by reference.

This literature describes the binder as a high solids acrylic emulsion polymer having the following typical properties:

| Solids content, % | 65.0 ± 0.5 |
|---|---|
| pH | 9.0 to 9.7 |
| Viscosity, cps. Brookfield No. 3 spindle-60 RPM | 300 to 700 |
| Minimum film formation temperature, °C. | +10° C. to +12° C. |
| Tukon hardness, KHN | <1 |
| Weight per gallon, lb. | 8.97 |
| Bulking value, gal./lb. - wet | 0.1115 |
| - dry | 0.107 |
| Mechanical stability | |
| Waring Blender - 5 cycles | OK |
| Freeze-thaw stability - 5 cycles | OK |
| Calcium ion stability | OK |
| Oven stability-10 days at 140° F. | OK |
| $T_g$, approximately | +10° C. |

Other qualities of the binder are that the stability of the emulsion formed with it is excellent and problems are not experienced with sedimentation or excessive skinning as might be expected from its high solids content. Usual precautions should be taken against the loss of water from the surface of the emulsion, when handled in bulk storage tanks and drums. A humidification system is recommended with bulk storage and lids should be replaced promptly on drums after use.

A preferred coating composition, according to the invention, includes, besides the two emulsion binders, and the extender pigment, auxiliary functional constituents as follows: "Varsol 1" (trade mark) a solvent type material which acts to retard skin formation and allow adequate time for working the coating; "Nopco NXZ" (trade mark) as a defoaming agent in an amount within the range from about 0.1% to 0.3%; "Triton X-405" (trade mark) a nonionic surfactant present in an amount from about 0.5% to about 0.8%; "Calgon T" (trade mark) a primary pigment dispersant present in an amount from about 0.5% to about 0.8%; "Oratan 850" (trade mark) a secondary pigment dispersant in an amount from 0.05% to about 0.15%; ethylene glycol, an anti-freeze and pigment resin extender in an amount from about 0.1% to about 0.3%; formaldehyde, as a package preservative in an amount from about 0.05% to about 0.15%; ammonia in an amount effective to adjust the pH to within the range from about 9 to about 11; rutile titanium dioxide or other pigments or equally finely ground material or materials in an amount within the range from 0.7% to about 2.0%. All these amounts are by weight on the total composition.

A caulk formulation, using the caulk forming binder alone, employs "Methocel 60HG" (trade mark) as a thickener which aids in attaining caulk slump resistance. For the purposes of the coatings of the invention such an agent is omitted. Likewise, a caulk formulation, using the caulk forming binder, employs "Silane Z-6040" (trade mark) to improve adhesion to certain substrates, in particular wet adhesion to glass and glazed ceramic tiles. Such material is omitted from the present compositions unless they are to be applied to glass or smooth ceramic substrates.

The mixing of the various materials to form the coating composition is relatively straightforward. Preferred apparatus for mixing or similar high shear, low mixing equipment is a Sigma Blade mixer. While the sequence of addition of the constituents is not critical, a preferred sequence is to mix the first and second binders together first. Half the defoamer may also be added at that time. Then, the extender is added slowly over a period of, typically, say a minute, and then there is added slowly the "Varsol", the surfactants and the dispersants. The mixture of the resin with the extenders is quite stiff and lumpy and the addition of the surfactants and dispersants makes it into a nine creamy mass. The total mixing time may run, typically, to about an hour and a half to form a smooth thick spreadable composition.

The inclusion of a fungicide, for example, formaldehyde, in addition to the adjustment of the pH well up into the alkaline range discourages bacteria growth and undesirable odor. Other fungicidal agents may also be included, for example, mercury compounds or "Skane M-8", trade mark for 2-n-octyl-4-isothazolyn-3-one in the carrier solvent propylene glycol.

It will be understood that the compositions of the invention are not necessarily limited to the auxiliary functional agents named or to the precise amounts given for the formation of plasticizer-free caulks and related types of composition to provide the total compositions of the invention with the auxiliary functional properties as described.

Compositions, according to the invention, may be applied by conventional methods, for example, by brushing, spraying or spreading with a spatula directly on the substrate to thicknesses within the range from about 1/8th of an inch to about 1/16 of an inch in one, two or three coats depending on weather conditions and desired coating thickness. A typical coating of the invention will generally "skin" in about half an hour, is rain-proof after about a couple of hours and fully cured within about a week. Once cured, such coating is resistant to weathering, mechanical stress, and abrasion. The coating material adheres strongly to the substrate and remains adhered thereto, after settling, despite expansion and contraction or other movements, because of the great elasticity of the coating. The coating may be laid down on a scrim of woven fiberglass which gives the coating further strength.

The coatings laid down from the coating materials of the invention are competitive cost-wise with other materials. For one example, a roof coating, according to the present invention, is competitive with a built-up tar and gravel roof.

A sheath made up of a membrane formed from the coating compositions described over a concrete shell has remarkable properties because of the inter-relationship between the concrete shell and the resin membrane. The shell being tenaciously adherent to the substrate, and when the latter is a plastic foam acts as a primer permitting bonding of the resin emulsion membrane to the foam surface to which it cannot effectively be bonded by direct contact. Compatability between the surface of the concrete shell and the resin emulsion membrane enables an effective bond between the shell and membrane so that the sheath is to all intents and purposes integral. This compatability is brought about partly by the resin modification of the concrete enabling it to take up moisture from the resin emulsion as it dries and partly by the properties of the resin emulsion whose capillary openings permit eventual escape of moisture from the membrane itself and from beneath it.

Acrylic Emulsions

The literature on the acrylic emulsions referred to above describes these emulsions as follows.

Rhoplex LC-67 is a 65% solids, low Tg polymer emulsion binder that permits manufacture of plasticizer-free latex caulks. The elimination of plasticizer from latex caulk formulations by use of Rhoplex LC-67 binder yields a high-quality caulk that is not subject to plasticizer migration problems such as glassing and tackifying of paints with accompanying dirt pickup, mildew growth and loss of caulk flexibility on exterior exposure.

Caulks based on Rhoplex LC-67 retain the performance advantages of current commercial caulk emulsions, Rhoplex LC-40 and Rhoplex LC-45, over conventional latex caulks in terms of low shrinkage, initial low temperature flexibility, resistance to discoloration on aging or on ultraviolet exposure, and dry and wet adhesion to alkyd paints, glass, glazed ceramic and concrete substrates. Utilizing our suggested starting point formulation, a latex caulk can be manufactured which exhibits superior adhesion properties and superior elongation with satisfactory tensile and recovery properties, even as compared to the standard 3:1 pigment to binder ratio of Rhoplex LC-40 and Rhoplex LC-45 based caulks.

Rhoplex LC-67 is an aqueous acrylic emulsion polymer designed as an internally plasticized caulk vehicle with the following typical properties:

| | |
|---|---|
| Appearance | Milky white liquid |
| Solids content, % | 64.5 to 65.5 |
| pH, as packed | 4.8 to 5.4 |
| Specific gravity | 1.04 |
| Density, lbs./U.S. gal. | 8.66 |
| Minimum film-formation temperature, °C. | Less than 0 |
| Glass transition temperature (Tg), °C. | Approximately — |
| Tukon hardness (KHN) | Less than 1 |
| Storage stability | Protect from freezing |

Rhoplex AC-707 is a high solids, acrylic emulsion polymer. Several formulating and manufacturing advantages are realized from utilizing a higher solids content emulsion. Less emulsion must be handled and stored to produce a paint at a given binder solids. More formulation latitude is available as a result of less water being present with high solids emulsion. For example, water included in lower solids emulsion could now be used to predisperse other ingredients or could be used to increase the grind volume. Higher volume solids paints can be formulated with satisfactory brushing properties while still offering improved film build and higher hiding.

These are typical properties of Rhoplex AC-707, but should not be considered specifications:

| | |
|---|---|
| Solids content, % | 65.0±0.5 |
| pH | 9.0 to 9.7 |
| Viscosity, cps. Brookfield No. 3 spindle - 60 RPM | 300 to 700 |
| Minimum film formation temperature, °C. | 5 to 9 |
| Tukon hardness, (KHN) | <1 |
| Weight per gallon, lb. | 8.97 |
| Bulking value, gal./lb. - wet | 0.1115 |
| - dry | 0.107 |
| Mechanical stability | |
| Waring Blender - 5 cycles | OK |
| Freeze-thaw stability - 5 cycles | OK |
| Calcium ion stability | OK |
| Oven stability - 10 days at 140° F. | OK |

Emulsion stability of Rhoplex AC-707 is excellent and no problems have been experienced with sedimentation or excessive skinning as might be expected from the high solids content. However, the usual precautions should be taken against the loss of water from the surface when Rhoplex AC-707 is handled in bulk storage tanks and drums. A humidification system is recommended with bulk storage of any Rhoplex emulsion. Lids should be replaced promptly on drums after use.

Paints formulated from Rhoplex AC-707 have properties intermediate between Rhoplex AC-35 and Rhoplex AC-388 formulations. The flow of paints based on Rhoplex AC-707 approaches that of Rhoplex AC-388. The film build is slightly lower than Rhoplex AC-388 but greater than Rhoplex AC-35. Adhesion to chalk and gloss alkyd approach the performance of Rhoplex AC-35. Although exterior exposure results are limited, we expect durability performance to be similar to Rhoplex AC-388.

When Rhoplex AC-707 is formulated into paints using our recommended formulations based on Rhoplex AC-388, the spread rate averages up to about twenty percent higher than that of paints formulated with Rhoplex Ac-388.

I claim:

1. A roof structure comprising, a deck covered by an insulating blanket of synthetic resin foam,
   a continuous protective sheath covering the blanket and adhering tenaciously to the surface thereof and made up of a thin hard load supporting shell having high impact, flexural and tensile, and thin section strength from about 1.5 mm to about 5.0 mm thick of reinforced concrete made with hydraulic cement modified with a minor amount of a synthetic resin latex cement modifier, a fine aggregate and reinforcing material,
   said shell covered by a soft weather-resistant rubbery-textured microporous membrane adhering tenaciously to its surface and having a thickness from about 0.75 mm to about 3 mm thick and laid down from a binder material of a non-plasticized latex of elastomeric type polymer filled with finely divided extender.

2. A roof structure, as defined in claim 1, in which the cement is modified with an acrylic latex cement modifier.

3. A roof structure, as defined in claim 1, in which the concrete is reinforced with glass fibers.

4. A roof structure, as defined in claim 1, in which the membrane is layed down from an acrylic emulsion.

5. A roof structure, as defined in claim 4, in which the acrylic emulsion is a highly filled predominantly caulk latex.

6. A roof, as defined in claim 5, in which the latex is predominantly a blend of an internally plasticized caulk vehicle aqueous acrylic emulsion polymer and a high solids acrylic emulsion latex paint vehicle.

7. A roof structure, as defined in claim 1, in which the blanket and sheath have a series of steps including respective surfaces meeting at a sharp angle.

8. A roof structure, as defined in claim 1, in which the hydraulic cement is modified with from about 5% to about 20% by weight of a synthetic latex cement modifier.

9. A roof structure, as defined in claim 1, in which the concrete has an impact strength of at least 6 to 16 inch pounds, a tensile strength greater than 100 pounds per square inch, and a shear bond adhesion at least ten times that of unmodified concrete made with Portland cement.

10. A roof structure, comprising,
    a deck covered by an insulating blanket of synthetic resin foam, in which the roof edges have a downwardly extending surface merging with an inwardly extending surface,
    a continuous protective sheath covering the blanket and adhering tenaciously to the surface thereof and being made up of a thin hard shell of reinforced concrete covered by a soft weather-resistant rubbery-textured membrane adhering tenaciously thereto,
    the sheath being in the form of a protective bonnet which covers the entire insulating blanket and extends in a girdle over said edges and adheres tenaciously to the surface thereof to anchor the sheath to the deck,
    the shell terminating on the downwardly extending surface and the membrane extending therebeyond along the inwardly extending surface.

11. A roof structure, comprising,
    a deck covered by an insulating blanket of synthetic resin foam,
    the roof edges having a downwardly extending surface merging with an inwardly extending surface,
    a continuous protective sheath covering the blanket and adhering tenaciously to the surface thereof and made up of a thin hard shell of reinforced concrete covered by a soft weather-resistant rubbery-textured membrane adhering tenaciously thereto,
    the sheath being in the form of a protective bonnet which covers the entire insulating blanket and extends in a girdle over said edges and adheres tenaciously to the surface thereof to anchor the sheath to the deck,
    the shell terminating on the downwardly extending surface and the membrane extending therebeyond along the inwardly extending surface,
    the structure including a finishing strip extending about the edge of the deck at the edges of the roof and having a downwardly extending face meeting at an underface,
    the insulating blanket covering the deck and finishing strip and having a downwardly extending face forming a continuation of the downwardly extending face of the finishing strip,
    the shell extending along the downwardly extending face of the finishing strip and terminating thereon,
    the membrane extending beyond the shell and along the underface of the finishing strip,
    the downwardly and inwardly extending part of the bonnet constituting the girdle further anchoring the bonnet to the roof.

* * * * *